US000001082H

United States Statutory Invention Registration [19]

[11] Reg. Number: H1082

[43] Published: Aug. 4, 1992

Andrew

[54] MAIN-STAGE SOLID-PROPELLANT ROCKET MOTOR DESIGN

[76] Inventor: James W. Andrew, P.O. Box 18472, Salt Lake City, Utah 84118

[21] Appl. No.: 717,941

[22] Filed: Jan. 3, 1991

[51] Int. Cl.[5] ..... F02K 9/18; F02K 9/34

[52] U.S. Cl. ..... 60/253; 60/255

*Primary Examiner*—Michael J. Carone

[57] ABSTRACT

A ballistic missile main-stage solid-propellant rocket motor; including a propellant grain configuration tailored to provide required missile ballistic performance, having a center bore, major and minor rear fin slots, and a silver eliminator bore enlargement; utilizing a forward pressure equalizing flap; and designed to accommodate severe operating conditions.

3 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

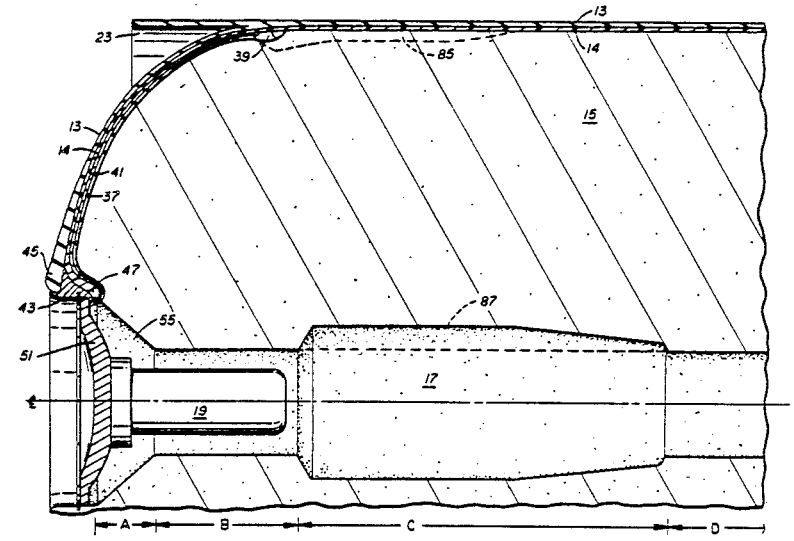

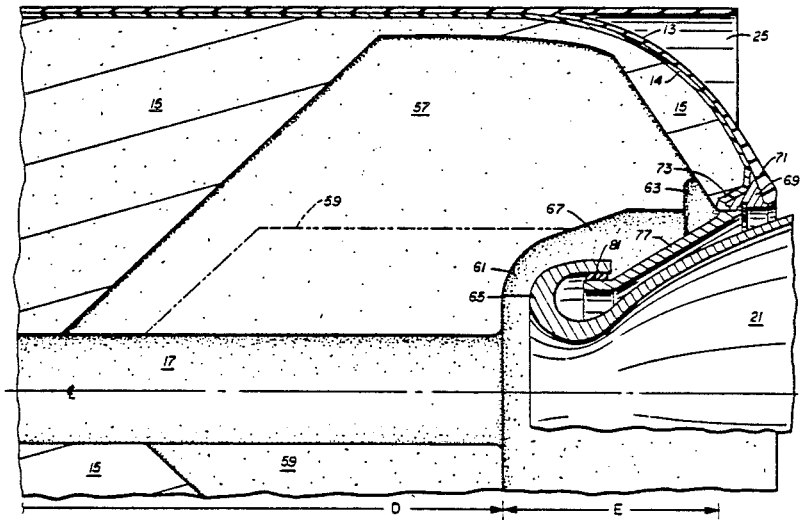

MAIN-STAGE SOLID-PROPELLANT ROCKET MOTOR DESIGN

FIELD OF THE INVENTION

The present invention relates to solid propellant rocket motors, and more particularly but without limitation thereto to a solid propellant grain design for use in a ballistic missile first-stage rocket motor.

BACKGROUND OF THE INVENTION

There is a constant striving for new ways to improve solid rocket motor performance, driven by a demand for increased ballistic missile range and payload capabilities. Ways to improve performance include techniques to tailor thrust to missile flight requirements (i.e., to ballistic requirements), and techniques to increase fuel efficiency. The rocket motor grain design of the present invention is an embodiment of several such techniques.

OBJECTS, FEATURES, AND ADVANTAGES

It is an object of this invention to provide a solid propellant grain design that tailors rocket motor thrust output to optimally match ballistic missile thrust-absorbing capacity during the course of powered first-stage flight.

It is an object of this invention to provide a solid propellant grain design that can efficiently utilize all of the solid propellant fuel during the course of powered first-stage flight.

It is an object of this invention to provide a solid propellant rocket motor design that will minimize the risk of grain fracture.

It is a feature of this invention to utilize a grain having a longitudinal center bore, with a plurality of major fin slots and an equal number of interposed minor fin slots located at the rear section of the grain, the slots extending radially outward from the bore in a radiosymmetric pattern.

It is a feature of this invention to locally increase the diameter of the longitudinal bore through the grain center in the region near the front of the grain (this localized enlargement of the bore is referred to as the silver eliminator).

It is a feature of this invention to utilize a flexible flap over the forward end of the grain, with a layer of netting place between the flap and insulator, to separate the grain from the insulator bonded to the front of the chamber.

It is an advantage of this invention that the propellant burning surface area ($S_b$) can be tailored with respect to time by varying the longitudinal dimensions and the outer tip diameters of the two sets (major and minor) of fin slots.

It is an advantage of this invention that the thrust at burnout (prior to second stage separation) can be made to abruptly terminate from a high thrust level, thus utilizing the last remaining fuel for effective propulsion and thereby increasing performance (e.g., range).

It is an advantage of this invention that sagging of the grain due to high acceleration is accommodated by the forward end flexible flap, thus reducing the risk of propellant grain fracture.

SUMMARY OF THE INVENTION

Accordingly, the present invention relates to a ballistic missile first-stage solid-propellant rocket motor design, and consists primarily of a case (which includes a chamber), an internal insulator, a protective front end flap, the propellant grain, an igniter, and a nozzle.

The propellant is a fairly soft, low-strength, pliable material. The insulator is a layer of fairly soft rubbery material which is bonded to the stiff, high-strength case. The flap is a sheet of rubbery material that is positioned between the insulator and the front of the propellant grain, and functions to prevent the front section of the propellant from becoming attached to the adjacent front section of the insulator. The general manufacturing steps for casting the solid propellant into the rocket motor case chamber (with the insulator and end flap already in place within the chamber) consist of first mixing the liquid ingredients together; next mixing the liquid and solid ingredients together; and then casting the propellant in place against an embedded-granule/adhesive (consisting of adhesive and propellant-base granules) which previously had been sprayed into the chamber to coat the exposed insulator and end flap surfaces.

The shape, size, position and number of major and minor fin slots, the center bore diameter, and the sliver eliminator shape are used to tailor the ballistic (thrust versus time) performance of the rocket motor. The silver eliminator tailors the shut down ballistics of the motor. In the preferred embodiment there are 5 major and 5 minor slots that extend longitudinally and radially. These major and minor slots are spaced apart and alternately to satisfy the ballistic and structural requirements of the motor. The stress relief groove and the flap bulb each serve to reduce the discontinuity stresses at the corresponding two case-to-grain (via insulator) bond interfaces.

When the motor is ignited, the propellant is consumed as the solid material transforms into hot gases which escape through the nozzle. The propellant contains its own fuel and oxidizers plus several other ingredients to control the thrust output and the effects of aging. As the propellant burns, the internal dimensions of the propellant grain are increased due to the pressure load enlarging the case and due to the burning phenomenon. Temperature and acceleration loads also deform the propellant grain and affect the structural integrity of the grain and the case bond system.

All of these severe operating characteristics are accommodated by the solid propellant rocket motor design of the present invention. The invention will be described in further detail with reference to the accompanying drawings.

DESCRIPTION OF THE PREFERRED EMBODIMENT

Figure 4A:
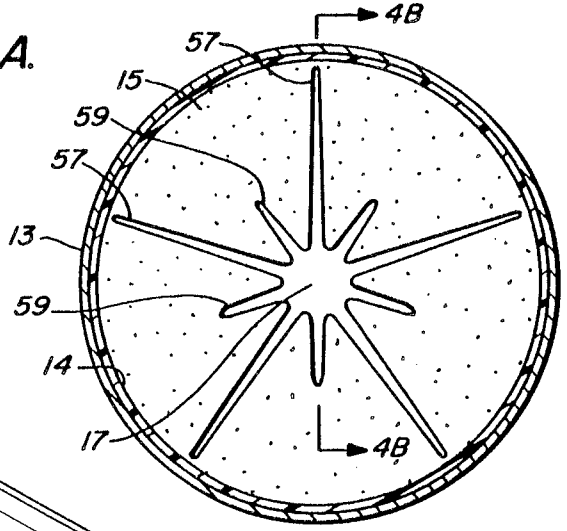
FIG. 4A is a cross-sectional view of the motor and grain taken at 4A—4A of FIG. 1, showing the circumferential features and the alternating sequence of the major and minor fin slots of the rocket motor propellant grain of the present invention.
Figure 1:
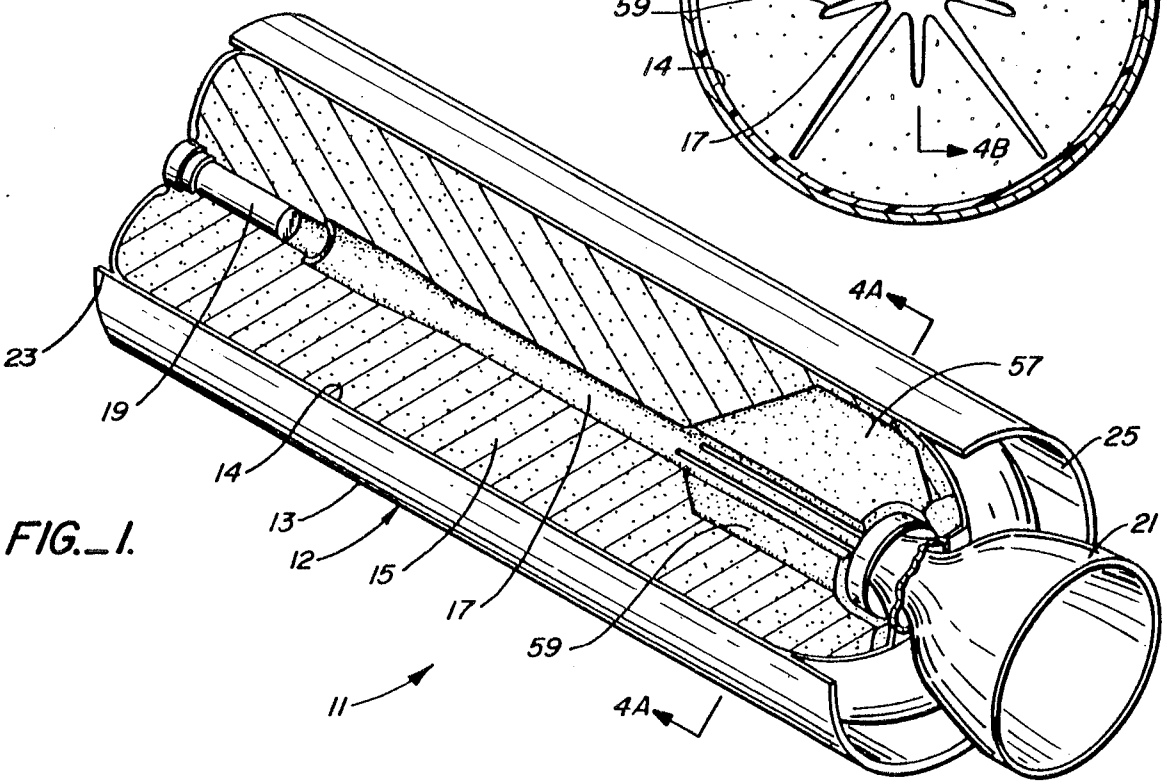
FIG. 1 is an overall perspective view of a missile first stage solid propellant rocket motor of the present invention.

In FIG. 1 is an overall perspective view of a first (i.e. main) stage missile rocket motor 11 of the present invention. In actual use there would be an interstage cylinder (not shown, which would contain a first stage igniter firing mechanism among other devices) connecting the first stage front skirt 23 to a second stage (not shown). The rocket motor 11 shown in FIG. 1 (and also in FIGS. 2 and 3 which are sectional side views of the front and rear portions) includes a case 12 (further including a cylindrical dome-ended chamber 13, and front and rear skirts 23 and 25 respectively), insulator 14, propellant grain 15, propellant center bore 17, igniter 19, and nozzle 21.

Figure 2:
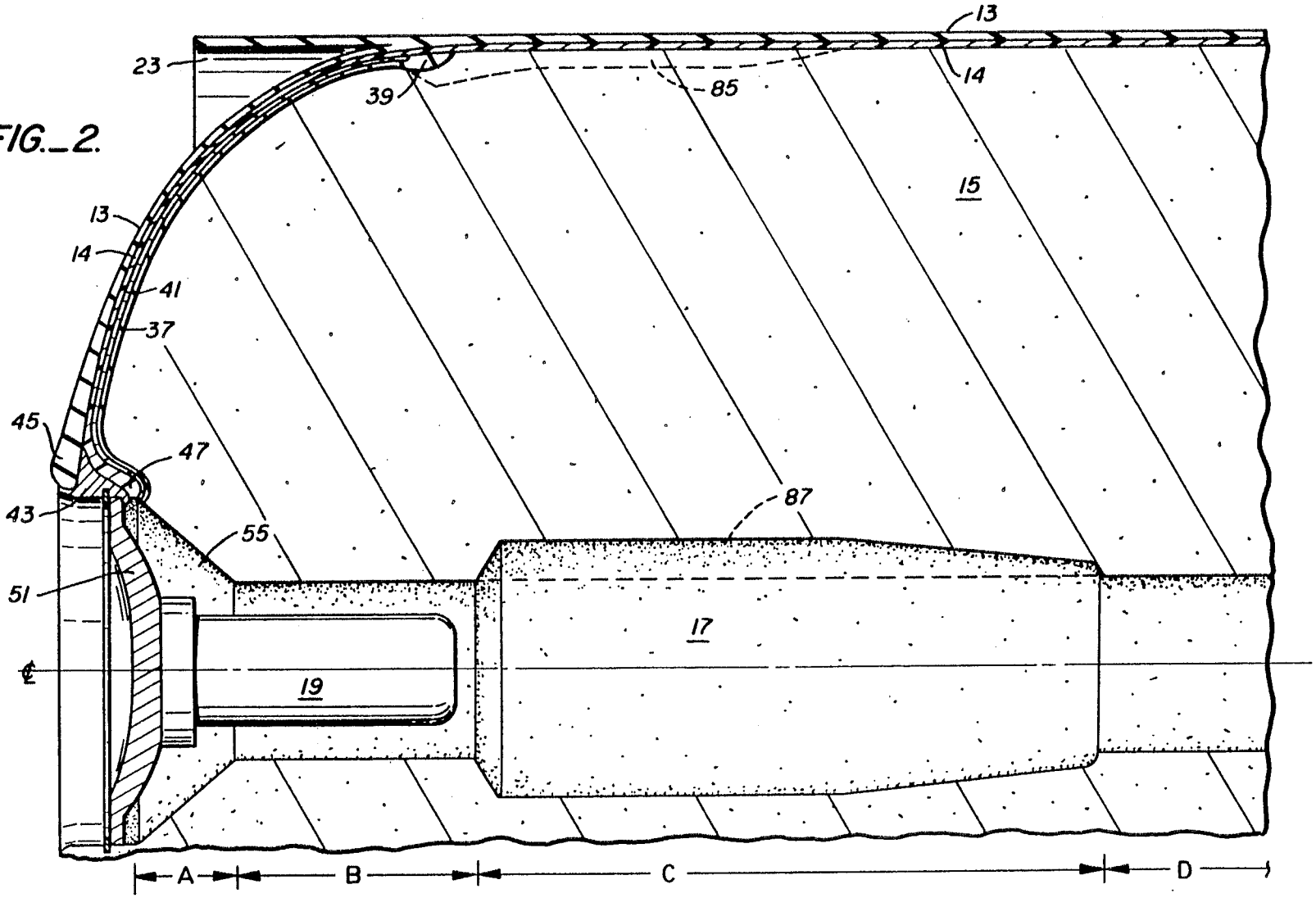
FIG. 2 is a sectional side view of the front portion of the rocket motor of the present invention.

In FIG. 2 is shown the front end of the rocket motor 11 including propellant grain 15. In addition to the previously identified components are shown pressure equalizing flap 37 and stress relief flap bulb 39. Flap 37 is a sheet of rubbery material that is positioned between insulator 14 and propellant grain 15 and functions to prevent the front section of the propellant grain 15 from becoming attached to the adjacent front section of the insulator 14. The function of flap bulb 39, which is part of flap 37, is to provide stress relief between the insulator 14 and propellant 15 at the termination of the flap 37.

To assure the free flow of gases into the space between flap 37 and insulator 14 during operation, an open polypropylene netting 41, made of crossed strands of nominally one millimeter diameter spaced on three millimeter centers, is interposed between the flap 37 and the insulator 14. Such a netting is commercially available from Hercules Incorporated, sold under the trademark VEXAR; further details are set forth in the Department of the Navy Weapons Specification (WS) 15209A, entitled "Material Specification, Netting, Polypropylene," which is hereby incorporated by reference. Tis gas flow is necessary to assure that pressure is equalized on the outer and inner surfaces of the front section of propellant grain 15. This pressure equalization is necessary because, in addition to the internal rocket motor pressure that expands all parts of chamber 13 outwardly, the acceleration force causes the long propellant grain to sag toward the rear; the cumulative effect is the formation of a gap between the front section of propellant grain 15 and the insulator 14. If this gap ware closed (which would occur if gases were not allowed to fill this gap and/or the propellant were bonded to the insulator) then the propellant grain 15 could be axially strained beyond its stress limits, resulting in grain failure by tearing or cracking.

Figure 5:
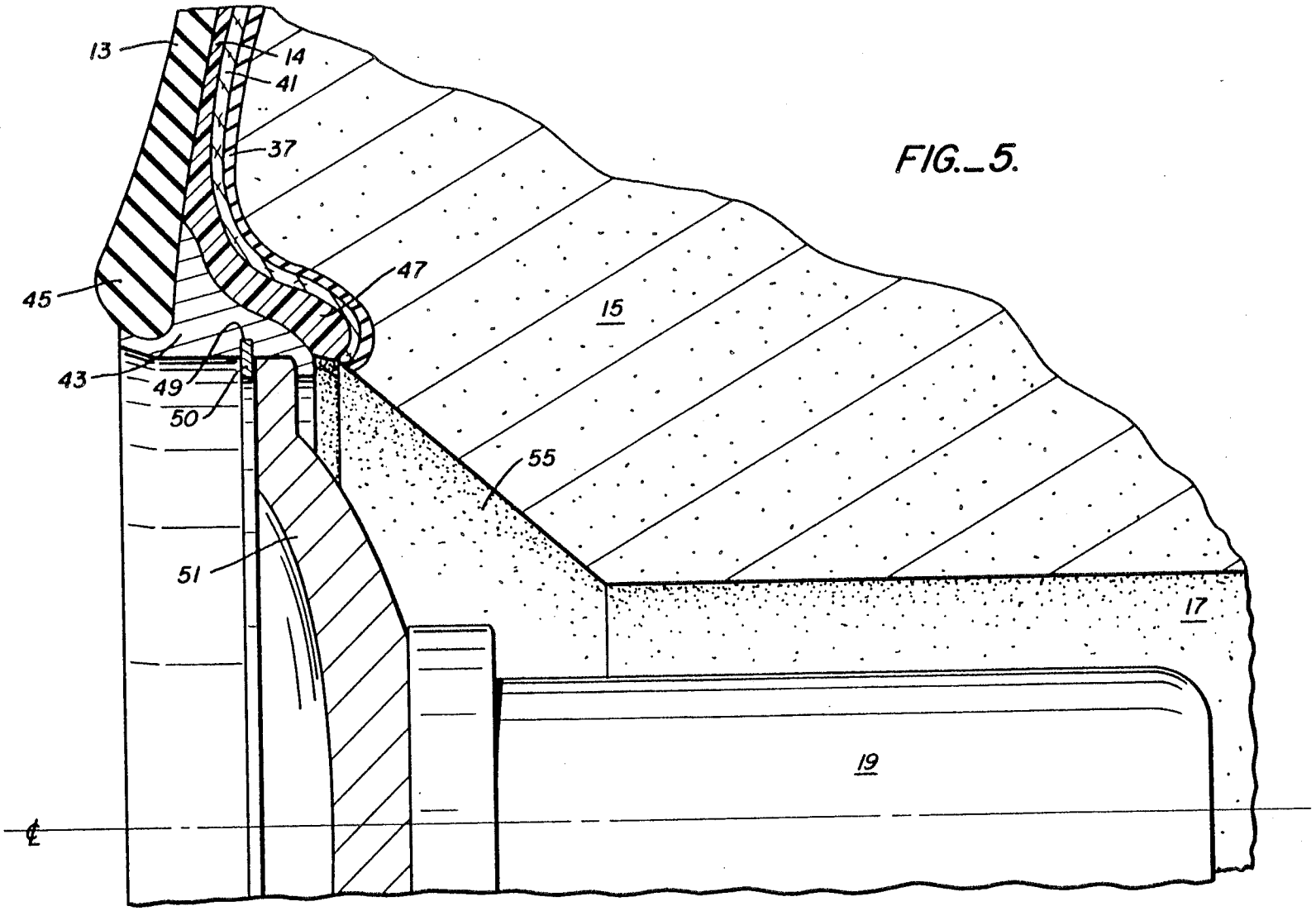
FIG. 5 is an enlarge sectional side view of the front end of the rocket motor showing the interrelationship of the chamber, insulator, front adapter ring, propellant grain and igniter.

A front adapted ring 43 is provided between the locally thickened chamber front wall 45 and the thickened insulator region 47. As shown in FIG. 5 the front adapter ring 43 has a front snap ring groove 49 for holding front snap ring 50 and front closure 51 in position. Attached to the front closure 51 is igniter 19 that extends into the front region of center bore 17. It should be noted that a conical cavity 55 is formed between the propellant 15 and igniter 19 and closure 51 to assure the flow of hot gases to the front section of the propellant.

In FIG. 3 and FIGS. 4A–4E are shown the rear end of the rocket motor 11 and propellant grain 15. The grain 15 includes a plurality of major fin slots 57 and an equal number of interposed minor fin slots 59, the slots extending radially outward from the bore 17 in a radiosymmetric pattern as illustrated; in the preferred embodiment illustrated there are five major and five minor fin slots. Also provided in propellant grain 15 is nozzle cavity 61 and stress relief groove 63. The nozzle entrance and throat section 65 is positioned within nozzle cavity 61 and leaves clearance space 67 for nozzle movement and gas flow.

Figures 6, 7:
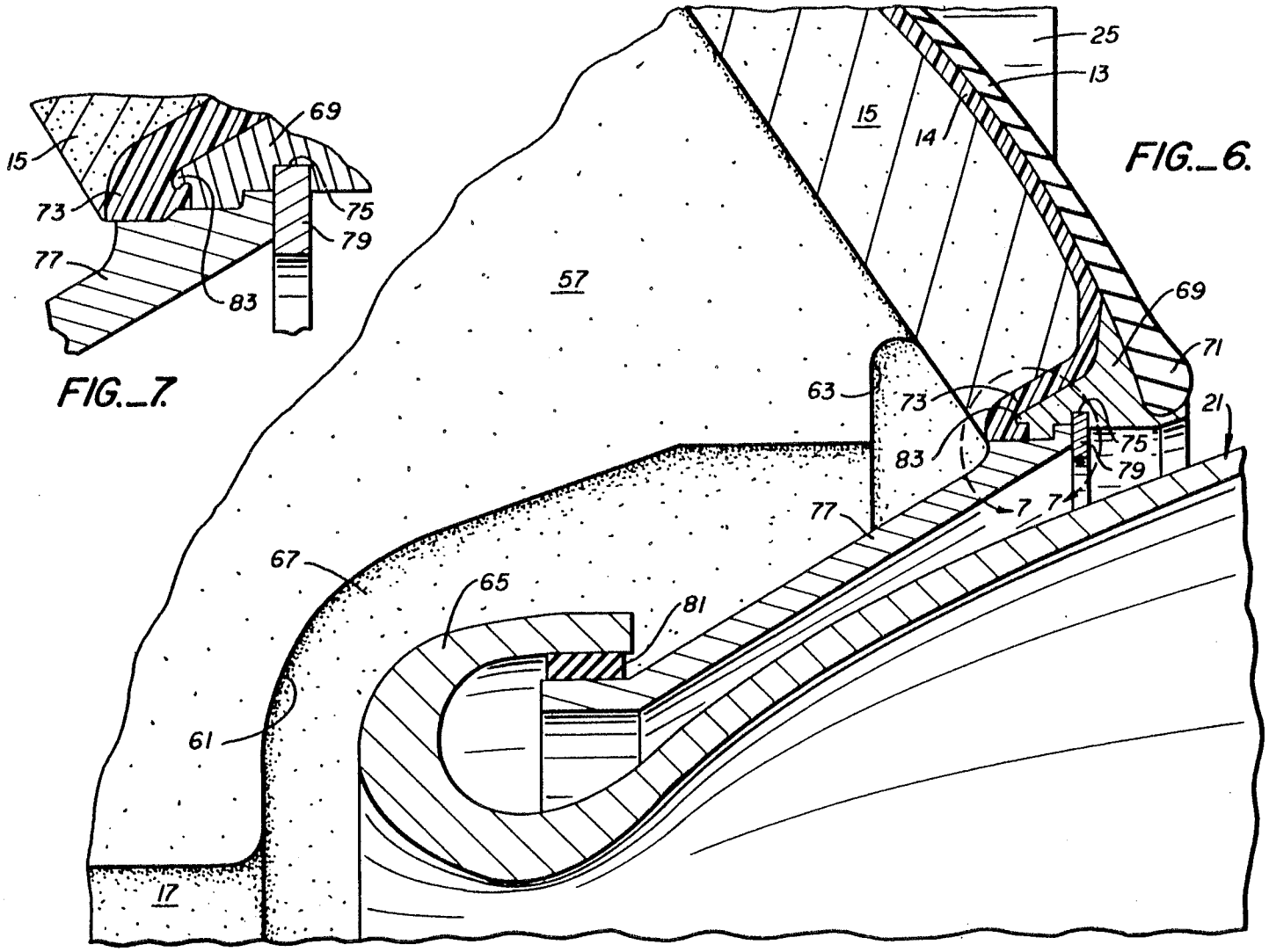
FIG. 6 is an enlarged sectional side view of the rear end of the rocket motor showing the interrelationship of the chamber, insulator, rear adapter ring, propellant and nozzle.
FIG. 7 is an enlarged detail view of the area enclosed by line 7—7 of FIG. 6, showing the locking relationship of the rear adapter ring and the insulator.

A rear adapter ring 69 is provided between the locally thickened chamber rear wall 71 and the insulator 14 curved region 73. As shown in FIG. 6 the rear adapter ring 69 has a rear snap ring groove 75 to hold the stationary shell 77 in position with rear snap ring 79. The nozzle entrance and throat section 65 is mounted on the stationary shell 77 by means of a flex seal 81. The flex seal allows the nozzle 21 to rotate which provides thrust vectoring. As best shown in FIG. 7, which is an enlarged view of the area within line 7—7 of FIG. 6, the mechanism for locking the insulator 14 to the rear adapter ring 69 is that of locking the end of the curved insulator region 73 in place by lip 83 that is formed in rear adapter ring 69.

Figure 3:
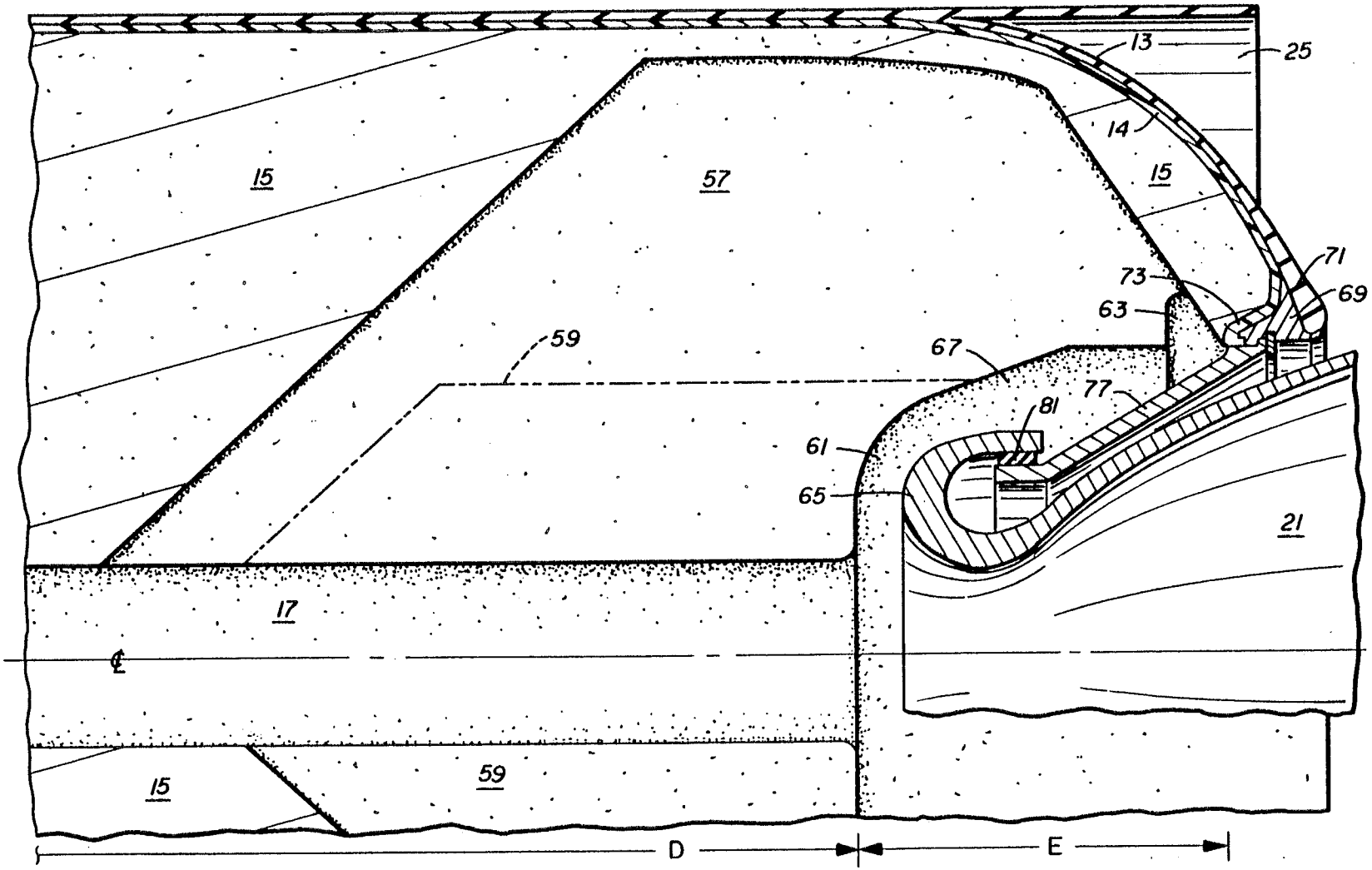
FIG. 3 is a sectional side view of the rear portion of the rocket motor of the present invention.
Figure 4C:
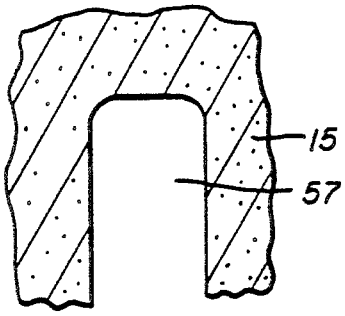
FIG. 4C is a sectional view of the tip of the major fin slot taken at 4C—4C of FIG. 4B.
Figure 4B:
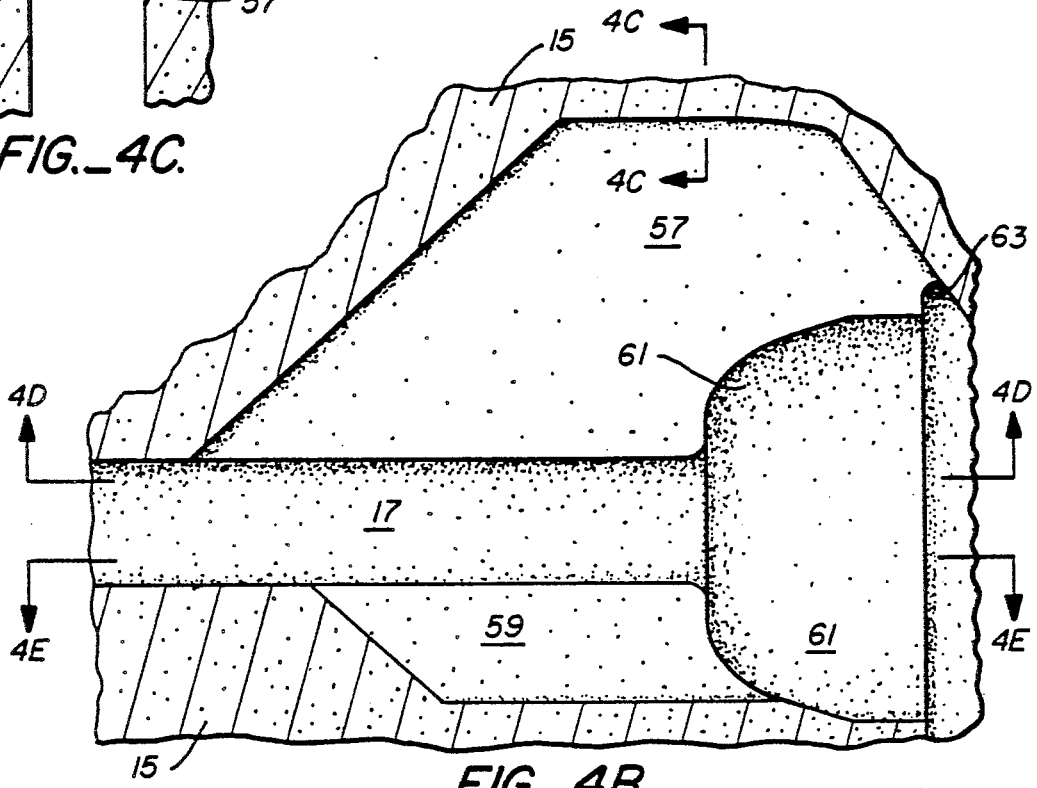
FIG. 4B is a side sectional view taken at 4B—4B of FIG. 4A that shows the axial and radial features of the major and minor fin slots of the rocket motor propellant grain.
Figure 4D:
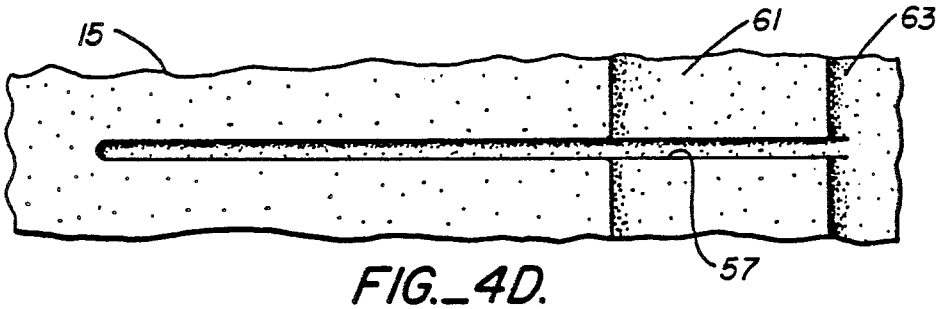
FIG. 4D is a view of the major fin slot taken at 4D—4D of FIG. 4B.
Figure 4E:
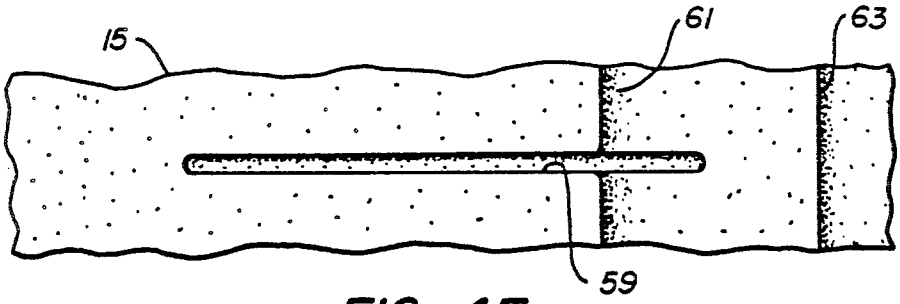
FIG. 4E is a view of the minor fin slot taken at 4E—4E of FIG. 4B.

In FIGS. 2 and 3 are shown regions A through E illustrating the significant longitudinal sections of the propellant grain 15 which includes a center bore 17 throughout its length. Section A is the forward part of the igniter cavity previously discussed. Section B includes part of the igniter and the nominal center bore. Section C contains a uniquely shaped enlargement 87 of the center bore 17 designated as the sliver eliminator. The volume of the enlargement 87 (silver eliminator) is equal to the volume of the silver 85 (see dotted line, FIG. 2) of propellant that would remain unburned (due to the particular motor operating characteristics) and hence wasted after first stage separation, if the bore were not so enlarged. Section D is a continuation of the nominal center bore, including portions of the fin slots previously discussed. Section E is an enlargement of the rear of the center bore, nozzle cavity 61, to provide space for the nozzle 21 and its rotation for thrust vector control. It also includes a stress relief groove 63 formed in the propellant grain 15 to reduce the propellant 15 to insulator 14 bond pell stress at the innermost periphery of the insulator curved region 73.

Figure 8:
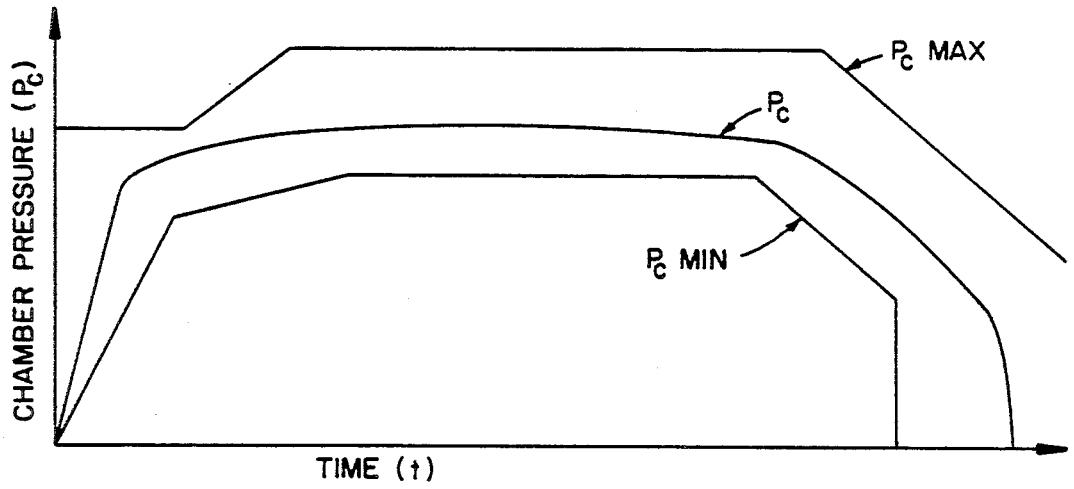
FIG. 8 shows curves representing maximum, minimum and design rocket motor chamber pressures as a function of time. p

In FIG. 8 is shown an example of pressure versus time curves (also an indication of thrust force). The $P_c$ max pressure curve represents maximum allowable motor pressure as primarily determined by the mechanical strength of the rocket motor. The $P_c$ min pressure curve represents the minimum allowable motor pressure that is principally determined by minimum missile ballistic performance requirements. $P_c$ is the design chamber pressure which is one of a family of allowable curves between $P_c$ max and $P_c$ min. The chamber pressure $P_c$ is defined by the relationship:

$$P_c = \frac{S_b \rho r}{A_t C_d}$$

where:

$P_c$=chamber pressure $S_b$=burning surface of the propellant $\rho$=propellant density $\Gamma$=propellant burning rate $A_t$=throat area of the nozzle $C_d$=flow factor It should be noted that the only significant variable in this relationship is the burning surface $S_b$. Therefore, to provide the required pressure curve ($P_c$) the propellant burning area $S_b$ must vary as a function of time This is achieved by the proper selection of the initial void geometry of the propellant grain, tailoring the dimensions of the center bore and the major and minor slots as herein described.

Figure 9:
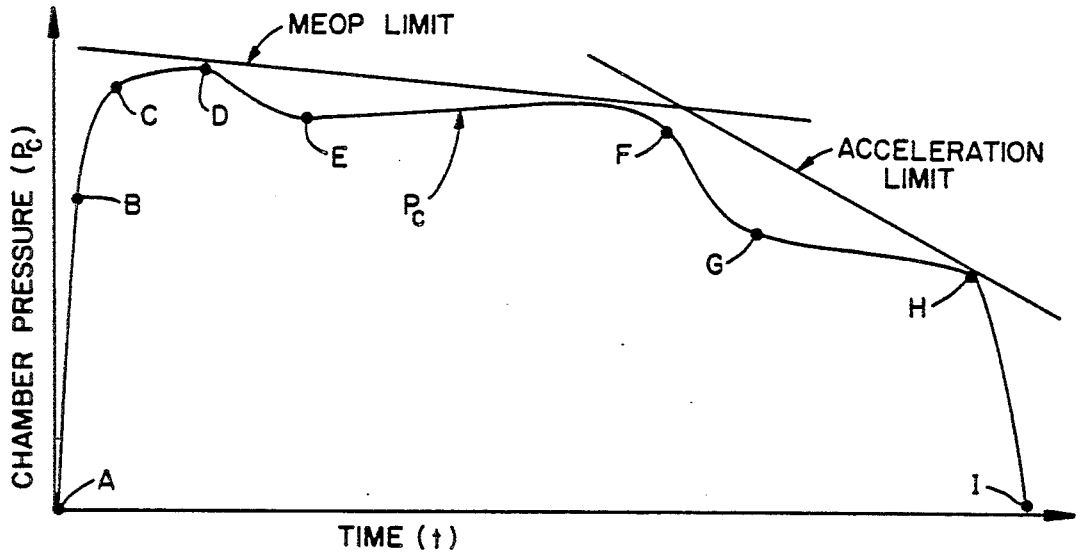
FIG. 9 shows curves representing maximum pressures based on factors limiting the case pressure forces and the missile acceleration forces.

Another design constraint is imposed by acceleration. In FIG. 9 is shown an example of pressure verses time curves that take into account both the maximum expected operating pressure (MEOP) as determined by the design of pressure components, and the thrust (hence pressure limit) imposed by maximum allowable acceleration design limits of the missile. Pc represents a hypothetical example of the operating pressure of the rocket motor using the herein described propellant grain. Point A represents ignition with a rapid build up of pressure. At point B the major and minor slots are burning. At point C the tips of the major slots have burned to the insulation; this tends to reduce the available burning area, but other areas are still increasing. At point D all of the major and minor slots are burning toward each other. At point E the minor slots have disappeared. At point F the major slots are starting to disappear and at point G the major slots are gone. At point H the forward section of propellant is gone and at point 1 there is complete burnout. From FIG. 9 it can be seen that the Pc curve closely approximates the pressure limit curves.

This invention has been described in detail with particular reference to a certain preferred embodiment, but it will be understood that variations and modifications can be effected within the spirit and scope of the invention.

That which is claimed is:

1. A rocket motor comprising:

a case which includes a cylindrical chamber having domed front and rear ends wherein said domed front end has a centrally located front opening and said domed rear end has a centrally located rear opening;

an insulator having a first surface and an opposite second surface, said insulator first surface bonded to and covering the interior surface of said chamber;

an open netting positioned against and covering said insulator second surface in the region of said domed front end;

a pressure equalizing flap having a first surface and an opposite second surface, said flap first surface positioned against and covering said netting, the outer periphery of said flap extending sufficiently beyond the periphery of said netting so that direct bonding is made between said flap first surface and said insulator second surface;

an embedded-granule/adhesive coating the second surfaces of said flap and said insulator where said second surfaces are exposed to said chamber interior;

a propellant grain positioned within the interior of said chamber, and against and bonded to said embedded-granule/adhesive coated flap and insulator second surfaces, said grain including a longitudinal bore that extends from said front opening to said rear opening;

a sliver eliminator means for ensuring that no unburned propellant remains after first-stage separation;

a local enlargement at the rearmost end of said bore defining a nozzle cavity, said cavity being adapted to receive a nozzle and associated flexible seal means between said nozzle and said domed rear end, said cavity being fluidly connected at the rearmost periphery to an annular stress relief groove at said groove inner periphery; and a plurality of major fin slots and an equal number of minor fin slots, said fin slots located at the rear section of said grain and extending radially outward from the bore in a radiosymmetric pattern alternating sequentially from major fin slot to minor fin slot.

2. A rocket motor as recited in claim 1, wherein said silver eliminator means includes a uniquely shaped enlargement of a forward portion of said longitudinal bore, the volume of said shaped enlargement being equal to the volume of propellant that would remain unburned after first stage separation if the bore were not so enlarged.

3. A rocket motor as recited in claim 2, wherein there are five major and five minor fin slots.

* * * * *